(12) United States Patent
Takahashi et al.

(10) Patent No.: US 11,219,100 B2
(45) Date of Patent: Jan. 4, 2022

(54) FLUID HEATING COMPONENT, FLUID HEATING COMPONENT COMPLEX, AND MANUFACTURING METHOD OF FLUID HEATING COMPONENT

(71) Applicant: NGK Insulators, Ltd., Nagoya (JP)

(72) Inventors: Hironori Takahashi, Nagoya (JP); Hiroki Ishida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 361 days.

(21) Appl. No.: 16/296,765

(22) Filed: Mar. 8, 2019

(65) Prior Publication Data
US 2019/0297684 A1 Sep. 26, 2019

(30) Foreign Application Priority Data

Mar. 20, 2018 (JP) .............................. JP2018-053319
Jan. 16, 2019 (JP) .............................. JP2019-005519

(51) Int. Cl.
*H05B 6/10* (2006.01)
*B28B 11/04* (2006.01)
*B28B 3/20* (2006.01)

(52) U.S. Cl.
CPC .............. *H05B 6/108* (2013.01); *B28B 11/04* (2013.01); *H05B 6/107* (2013.01); *B28B 3/20* (2013.01); *B28B 2003/203* (2013.01)

(58) Field of Classification Search
CPC .......... H05B 6/10; H05B 6/105; H05B 6/106; H05B 6/107; H05B 6/108; C04B 38/0006; C04B 38/0007; C04B 38/0009; C04B 2111/00793; C04B 2111/0081; C04B 41/009; C04B 41/4527; C04B 41/4539; C04B 41/4541; C04B 41/4572; C04B 41/5096; C04B 41/51; C04B 41/5114; C04B 41/5127; C04B 41/5133; C04B 41/5144; C04B 41/5155; C04B 41/5427; C04B 41/85; C04B 41/88; C04B 35/04; C04B 35/195; C04B 35/515; C04B 35/56; C04B 35/5607; C04B 35/5626; C04B 35/565; C04B 35/573; C04B 35/58; C04B 35/581; C04B 35/583; C04B 35/584; C04B 35/03; C04B 35/111; C04B 35/117; C04B 35/185; C04B 35/478; C04B 35/62222; C04B 35/80; C04B 38/0074;

(Continued)

(56) References Cited

U.S. PATENT DOCUMENTS

| | | | | | |
|---|---|---|---|---|---|
| 3,163,841 | A | * | 12/1964 | Willett | H05B 3/26 219/543 |
| 2005/0178761 | A1 | * | 8/2005 | Wakamatsu | F22B 1/281 219/629 |
| 2013/0224080 | A1 | * | 8/2013 | Ishihara | H05B 3/06 219/521 |

FOREIGN PATENT DOCUMENTS

| | | |
|---|---|---|
| JP | 2001-054723 A | 2/2001 |
| JP | 2013-238116 A | 11/2013 |

OTHER PUBLICATIONS

U.S. Appl. No. 16/296,734, filed Mar. 8, 2019, Hironori Takahashi.

* cited by examiner

*Primary Examiner* — Hung D Nguyen
(74) *Attorney, Agent, or Firm* — Burr & Brown, PLLC

(57) ABSTRACT

A fluid heating component including: a porous body made of ceramics and formed with through channels through which a fluid passes, and a conductive coating layer disposed on a through channel surface of at least a part of each through channel, wherein the conductive coating layer is electrically connected, and is continuous.

12 Claims, 10 Drawing Sheets

(58) Field of Classification Search
CPC . C04B 2111/94; B28B 3/20; B28B 2003/203; B28B 11/14; B28B 11/006; B28B 11/04; F01N 3/0222; F01N 3/2013; F01N 3/2026; F01N 3/2828; F01N 2510/00; F01N 2510/068; F01N 2330/06; F01N 2240/05; Y02T 10/12
USPC ........ 219/600, 628, 629, 634, 635, 642, 643
See application file for complete search history.

FLUID HEATING COMPONENT, FLUID HEATING COMPONENT COMPLEX, AND MANUFACTURING METHOD OF FLUID HEATING COMPONENT

The present application is an application based on JP 2018-053319 filed on Mar. 20, 2018 and JP2019-005519 filed on Jan. 16, 2019 with Japan Patent Office, the entire contents of which are incorporated herein by reference.

BACKGROUND OF THE INVENTION

Field of the Invention

The present invention relates to a fluid heating component, a manufacturing method of the fluid heating component, and a fluid heating component complex, and more particularly, it relates to a fluid heating component using a ceramic member, for example, a honeycomb structure to heat fluids such as a gas and a liquid by an electromagnetic induction heating system, a manufacturing method of the fluid heating component, and a fluid heating component complex formed of combined fluid heating components.

Description of the Related Art

Heretofore, for the purpose of, for example, improvement of a fuel efficiency of a car, friction loss at the start of an engine has been decreased and a purification performance of an exhaust gas purifying catalyst has been enhanced. In particular, immediately after the start of the engine, a liquid such as cooling water, engine oil or an automatic transmission fluid (ATF) or the exhaust gas purifying catalyst is in a cooled state, and hence an engine performance cannot sufficiently be exerted sometimes. To eliminate such problems, a heating system is employed to rapidly heat the liquid, for example, the cooling water up to a suitable temperature or to activate the exhaust gas purifying catalyst in early stages.

In the heating system, to heat a fluid (a liquid such as the cooling oil or the engine oil or a gas such as an exhaust gas), for example, there is used a fluid heating component including a honeycomb structure made of ceramics and having a high thermal conductivity, and a heating body such as a resistance heating type heater, a high-frequency heating type heater or a combustion heating type heater (e.g., see Patent Document 1). The honeycomb structure made of ceramics includes a plurality of cells defined by partition walls, and the cells form through channels for the above fluid. Thus, the honeycomb structure includes the plurality of cells, thereby increasing a contact area with the fluid, and heat generated by the heating body can efficiently propagate to the fluid.

On the other hand, a decomposition method is known in which a fluid containing a halogenated hydrocarbon gas and others is passed through a carrier, while heating the carrier having the conductivity by an electromagnetic induction heating system, to perform a thermal decomposition treatment of halogenated hydrocarbons at a high temperature (e.g., see Patent Document 2). According to this method, carbon ceramic such as silicon carbide (SiC), a stainless steel or the like is used as a base of the above carrier, and furthermore, there is used the carrier onto which at least one metal element (group I element) selected from the group consisting of platinum (Pt), palladium (Pd), gold (Au), rhodium (Rh) and nickel (Ni) and having a corrosion resistance to the halogenated hydrocarbon gas and at least one metal element (group II element) selected from the group consisting of tungsten (W), chromium (Cr), iron (Fe), molybdenum (Mo) and vanadium (V) are loaded as catalysts. The conductive carrier onto which these catalysts are loaded is heated by Joule heat of an eddy current generated by an electromagnetic induction coil disposed outside, and hence the fluid passing through the carrier can be heated.

[Patent Document 1] JP-A-2013-238116 [Patent Document 2] JP-A-2001-54723

SUMMARY OF THE INVENTION

However, such a fluid heating component as described above and such a method of decomposing a fluid (a halogenated hydrocarbon gas) by heating as described above have a possibility of causing defects which will be described below. Specifically, the fluid heating component described in Patent Document 1 is constituted of two members made of different materials, i.e., a honeycomb structure made of ceramics and a heating body made mainly of a metal or the like. Consequently, a heat resistance in the vicinity of a boundary between the honeycomb structure and the heating body increases, and heat generated by the heating body might not efficiently propagate through the honeycomb structure. As a result, there is the fear that a heating efficiency decreases.

Furthermore, the honeycomb structure and the heating body are made of the different materials, respectively, and hence a difference in thermal expansion coefficient between the honeycomb structure and the heating body during heating might raise a problem. That is, there is a possibility that gaps, voids and the like are generated in the vicinity of the boundary between the honeycomb structure and the heating body due to the difference in thermal expansion coefficient, and there is a possibility that the heating efficiency further decreases. In particular, when a comparatively large fluid heating component is formed, the above defects caused by the difference in thermal expansion coefficient might become remarkably apparent.

On the other hand, in a device using a conductive carrier as described in Patent Document 2, SiC itself for use as the carrier has a high electric resistance, a heat generation efficiency by an electromagnetic induction heating system therefore decreases, and a temperature of the carrier cannot rapidly rise up to a predetermined temperature sometimes. As a result, there are, for example, demerits that much time is required until the catalyst is activated and that much electric energy is required to raise the temperature up to the predetermined temperature.

To eliminate such problems, the present invention has been developed in view of the above actual circumstances, and objects thereof are to provide a fluid heating component which is made of ceramics and which enables efficient heating by an electromagnetic induction heating system and enables quick heating without being influenced by a difference in thermal expansion coefficient, to provide a fluid heating component complex, and to provide a manufacturing method of the fluid heating component.

According to the present invention, there are provided a fluid heating component, a manufacturing method of the fluid heating component and a fluid heating component complex which will be described below.

According to a first aspect of the present invention, a fluid heating component is provided including a porous body made of ceramics and formed with through channels through which a fluid passes, and a conductive coating layer disposed on a through channel surface of at least a part of each through channel, wherein the conductive coating layer is electrically connected, and is continuous.

According to a second aspect of the present invention, the fluid heating component according to the above first aspect is provided, which further includes a conductive pore portion coating layer disposed on the surface of a pore portion of the porous body, wherein the conductive coating layer is electrically connected to the conductive pore portion coating layer and is continuous.

According to a third aspect of the present invention, the fluid heating component according to the above second aspect is provided, wherein at least one of the conductive coating layer and the conductive pore portion coating layer has at least a part of the through channels formed in an annularly continuous state, in cut surface of the through channels which is perpendicular to a passing direction of the fluid.

According to a fourth aspect of the present invention, the fluid heating component according to the above first aspect is provided, wherein the conductive coating layer has at least a part of the through channels formed in an annularly continuous state, in a cut surface of the through channels is perpendicular to a passing direction of the fluid.

According to a fifth aspect of the present invention, the fluid heating component according to any one of the above first to fourth aspects is provided, wherein the porous body is a honeycomb structure including partition walls which define a plurality of cells extending from one end face to the other end face and formed as the through channels.

According to a sixth aspect of the present invention, the fluid heating component according to any one of the above first to fifth aspects is provided, wherein the porous body has a porosity of from 0.1% to 60%.

According to a seventh aspect of the present invention, the fluid heating component according to any one of the above first to sixth aspects is provided, wherein the porous body contains, as a main component, at least one ceramic component selected from the group consisting of silicon carbide, cordierite, a silicon-silicon carbide based composite material, mullite, alumina, spinel, a silicon carbide-cordierite based composite material, lithium aluminum silicate, aluminum titanate, silicon nitride, aluminum nitride, and magnesium oxide.

According to an eighth aspect of the present invention, the fluid heating component according to any one of the above first to seventh aspects is provided, wherein the porous body has a thermal conductivity of from 0.1 W/m·K to 300 W/m·K.

According to a ninth aspect of the present invention, the fluid heating component according to any one of the above first to eighth aspects is provided, wherein the porous body is made of ceramics containing silicon carbide as a main component, and an electric resistivity of the porous body is from 0.01 Ωcm to 10 Ωcm.

According to a tenth aspect of the present invention, the fluid heating component according to any one of the above first to ninth aspects is provided, wherein the conductive coating layer possesses a layer structure, and includes: an electroless plating layer which is in contact with the surface of the porous body, and at least one induction heating layer laminated on the electroless plating layer.

According to a eleventh aspect of the present invention, the fluid heating component according to any one of the above first to tenth aspects is provided, wherein the conductive coating layer has a coating layer thickness of from 0.1 μm to 500 μm.

According to a twelfth aspect of the present invention, a manufacturing method of the fluid heating component according to any one of the above first to eleventh aspects is provided, which includes a raw material fluid passing step of: passing a raw material fluid of a gas or a liquid containing components of the conductive coating layer along the through channels for the fluid which are formed in the porous body made of ceramics, and forming the conductive coating layer on the surfaces of the through channels.

According to a thirteenth aspect of the present invention, the manufacturing method of the fluid heating component according to the above twelfth aspect is provided, wherein the porous body is a honeycomb structure including partition walls which define a plurality of cells extending from one end face to the other end face and formed as the through channels for the fluid, the manufacturing method further including a plugging step of plugging the one end face of the honeycomb structure in accordance with a predetermined arrangement standard, and plugging the residual cells of the other end face, wherein in the raw material fluid passing step, the raw material fluid is passed through the honeycomb structure in which plugging portions are formed by the plugging step, to form the conductive coating layer.

According to a fourteenth aspect of the present invention, a fluid heating component complex which is formed by using the fluid heating component according to any one of the above first to eleventh aspects is provided, and which is monolithically constructed by using a plurality of prismatic columnar fluid heating components, or which is monolithically constructed by using at least one of the prismatic columnar fluid heating components, and one or a plurality of prismatic columnar porous bodies made of ceramics and formed with through channels through which a fluid passes.

According to a fluid heating component of the present invention, a fluid heating component complex and a manufacturing method of the fluid heating component, it is possible to rapidly and efficiently heat the fluid heating component by an electromagnetic induction heating system. As a result, it is possible to employ the fluid heating component in a heating system which is capable of rapidly heating up to a temperature to activate an exhaust gas purifying catalyst even immediately after a car engine is started.

Moreover, when the fluid heating component and the fluid heating component complex according to the present invention are employed in a filter for exhaust gas purification of an automobile engine, it is possible to help to burn off carbon particulates accumulated in the filter by using an electromagnetic induction heating system.

In particular, a conductive coating layer is disposed on through channel surfaces (cell surfaces) of a porous body (a honeycomb structure or the like) made of ceramics or a conductive pore portion coating layer is disposed on inner portions of partition walls, and the coating layer is electrically connected and continuous in a cut surface of the porous body, thereby enabling efficient induction heating. Furthermore, a local temperature rise does not occur, and it is possible to decrease the fear of occurrence of a defect that a heating efficiency decreases or cracks and the like are generated due to a difference in thermal expansion coefficient between the porous body and, for example, the conductive coating layer.

DESCRIPTION OF THE PREFERRED EMBODIMENTS

Hereinafter, description will be made as to embodiments of a fluid heating component of the present invention, a manufacturing method of the fluid heating component and a fluid heating component complex with reference to the drawings. It is to be noted that the fluid heating component of the present invention, the manufacturing method of the fluid heating component and the fluid heating component complex are not limited to the following embodiments, and changes, modifications, improvements and the like are addable without departing from the gist of the present invention.

1. Fluid Heating Component

Figure 1:
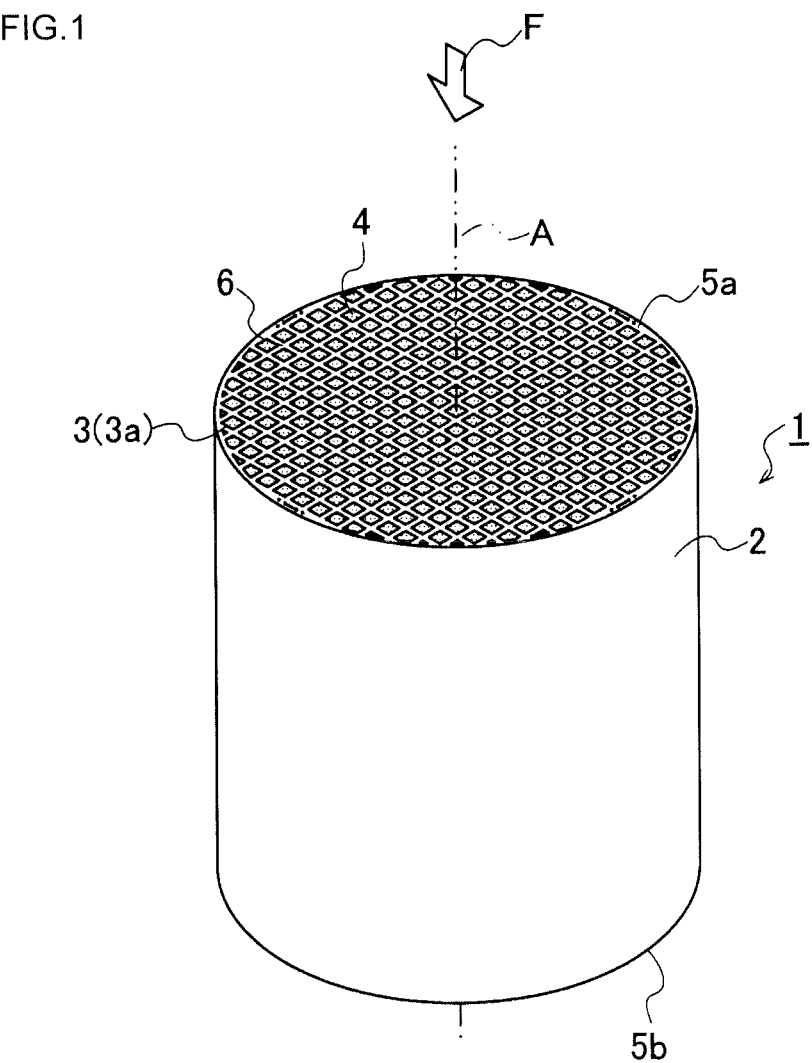
FIG. 1 is a perspective view showing a schematic constitution of a fluid heating component of one embodiment of the present invention.
Figure 2:
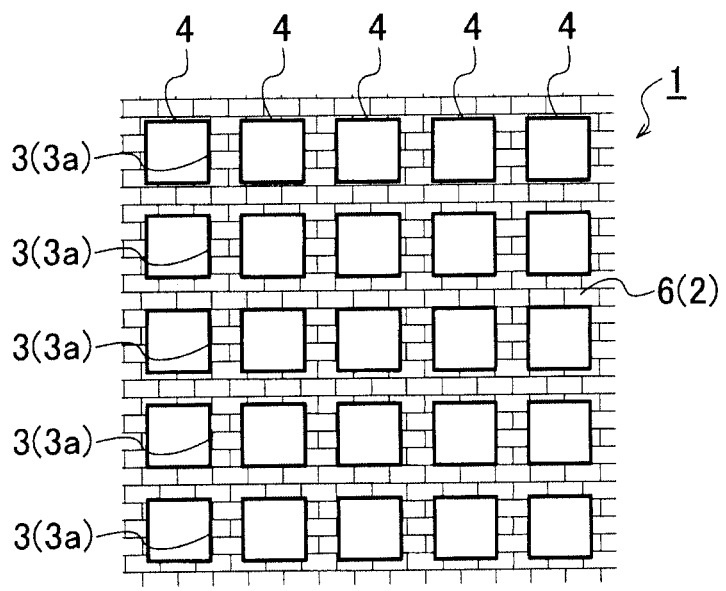
FIG. 2 is a partially enlarged sectional view showing a schematic constitution of the fluid heating component.

As shown in FIG. 1 and FIG. 2, a fluid heating component 1 of one embodiment of the present invention includes a honeycomb structure 2 made of ceramics, and a conductive coating layer 4 disposed on cell surfaces 3a (corresponding to through channel surfaces of the present invention) of cells 3 constituting through channels of the honeycomb structure 2.

Furthermore, in a cut surface of the honeycomb structure 2 which is perpendicular to a passing direction (corresponding to a direction from the front of a paper surface to the depth of the paper surface in FIG. 2) of a fluid F (see FIG. 1), i.e., an axial direction A (see FIG. 1) of the honeycomb structure 2, the conductive coating layer 4 is coated to annularly surround each cell surface 3a of the honeycomb structure 2 in a state where the conductive coating layer is electrically connected, and continuous.

Here, the "electrically connected and continuous" state is defined in the present description to indicate that conductive coating layers are not present in an "intermittently" scattered manner, and all the layers are electrically connected to enable passing of a current. FIG. 2 is a partially enlarged sectional view of a cut surface of the fluid heating component 1 which is cut along the direction perpendicular to the axial direction A of the honeycomb structure 2. Furthermore, the conductive coating layer 4 disposed on each cell surface 3a is not necessarily required to be coated over the whole cell surface 3a of the honeycomb structure 2, but may possess an annular shape (a ring shape) to have the electrically connected state in at least a part of the cut surface (details will be described later).

The honeycomb structure 2 corresponds to a porous body made of ceramics in the fluid heating component 1 of the present invention. Further specifically, the honeycomb structure 2 is a structure possessing a substantially round pillar shape and including latticed partition walls 6 which define a plurality of cells 3 extending from one end face 5a to the other end face 5b and formed as through channels for the fluid F.

Thus, the honeycomb structure 2 as the porous body includes such a constitution, and hence the fluid F introduced from the one end face 5a of the honeycomb structure 2 of the fluid heating component 1 into the component passes through the cells 3 in the honeycomb structure 2 and is discharged from the other end face 5b. It is to be noted that the porous body in the fluid heating component of the present invention is not limited to the substantially round pillar-shaped honeycomb structure 2 shown in, for example, FIG. 1, and there are not any special restrictions on the porous body, as long as the porous body includes the through channels for the fluid F which correspond to the cells 3 and has the constitution where the conductive coating layer 4 is disposed on the through channel surfaces.

Figure 3:
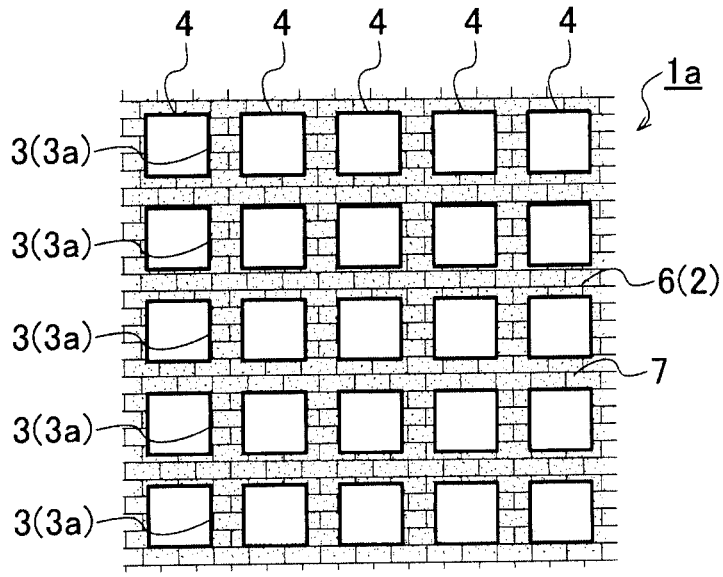
FIG. 3 is a partially enlarged sectional view showing another example of the constitution of the fluid heating component.

The honeycomb structure 2 is porous, and includes a plurality of fine pore portions (not shown) in the partition walls 6 which define the cells 3. Therefore, the honeycomb structure may constitute a fluid heating component 1a formed with a conductive coating layer 4 along cell surfaces 3a and including a conductive pore portion coating layer 7 on the surfaces of the pore portions in the partition walls 6 (see FIG. 3). It is to be noted that FIG. 3 schematically shows the conductive pore portion coating layer 7 by hatching. In this case, it is desirable that the conductive coating layer 4 formed on the cell surfaces 3a is electrically connected to the conductive pore portion coating layer 7.

When the conductive coating layer 4 and the conductive pore portion coating layer 7 are coated in the state where they are electrically connected to the porous honeycomb structure 2, it is preferable that an electrically connected loop exists on the cut surface cut along a direction perpendicular to the axial direction of the honeycomb structure 2. The shape of the loop observed in a state of facing the cut surface is not particularly limited, and may be any shape selected from a circular shape, an elliptical shape, a triangle, a quadrangle, a hexagon, the other polygonal shapes, and the like, for example.

Furthermore, it is more preferable that the loop is a loop whose long diameter observed in a state of facing the cut surface is large. A frequency at induction heating can be suppressed by increasing the long diameter of the loop. If the frequency is lowered, it has an advantage that it is easy to apply a larger output. Herein, for example, the long diameter of the loop is preferably 5 mm or more, is further preferably 10 mm or more, and still more preferably 20 mm or more. Furthermore, when setting the frequency of induction heating to 30 kHz as a low value, the long diameter of the loop is preferably 15 mm or more and is further preferably 20 mm or more.

Additionally, FIG. 1 to FIG. 3 show the fluid heating components 1 and 1a each including the conductive coating layer 4 and/or the conductive pore portion coating layer 7 to each whole cell 3 of the honeycomb structure 2, but the present invention is not limited to these examples. That is, in the cut surface of the honeycomb structure 2 which is cut along a direction perpendicular to the axial direction of the honeycomb structure 2, the conductive coating layer 4 and/or the conductive pore portion coating layer 7 may be disposed in a specific region, and the conductive coating layer 4 or the like may not be disposed in the residual region.

Consequently, when the fluid heating component is heated by an electromagnetic induction heating system, it is possible to efficiently heat the whole fluid heating component. A region to be heated in this manner is also adjustable in accordance with presence/absence of the conductive coating layer 4. It is to be noted that even when the conductive coating layer 4 or the like is disposed in the above specific region, the cell surfaces 3a (the through channel surfaces) of the cells 3 in the cut surface of the conductive coating layer 4 are required to be electrically connected in each region.

When the conductive coating layer is not electrically connected and is not continuous, i.e., the layer is "the intermittently conductive coating layer", a sufficient heating efficiency cannot be obtained by use of an induction heating apparatus having an especially low frequency (wavelength). On the other hand, the fluid heating component of the present embodiment can eliminate the above defect and obtain the sufficient heating efficiency.

The honeycomb structure 2 contains predetermined ceramics as a main component, it is therefore possible to increase a thermal conductivity of the partition walls 6, and it is also possible to perform, for example, efficient heating of the fluid F. It is to be noted that in the present description, "the main component" is defined as a component contained as much as 50 mass % or more in the honeycomb structure 2, and also contains, for example, metal composite ceramics.

It is preferable that a porosity of the porous ceramics is in a range of 0.1% to 60%, and a preferable porosity can be selected suitably in accordance with design. It is to be noted that the porosity can be measured by Archimedes' method or with a mercury porosimeter (e.g., AutoPore 9500 (tradename) manufactured by Micromeritics Instrument Corp.).

Furthermore, as the above ceramics, there can be used various materials such as well-known cordierite, silicon carbide, silicon-silicon carbide composite material, mullite, alumina, spinel, silicon carbide-cordierite based composite material and lithium aluminum silicate, and additionally, aluminum titanate, silicon nitride, aluminum nitride and magnesium oxide. In particular, when heat conduction properties to the fluid F are taken into consideration, it is suitable to use a main component selected from the group consisting of silicon carbide, silicon nitride, aluminum nitride, magnesium oxide and others which have a high thermal conductivity. Furthermore, when the honeycomb structure 2 contains silicon carbide as the main component, there is a merit that the honeycomb structure is excellent in heat resistance and corrosion resistance in addition to the above thermal conductivity.

Additionally, as a material of a substrate constituting the honeycomb structure 2, for example, Si-impregnated SiC, (Si+Al) impregnated SiC, metal composite SiC, recrystallized SiC, $Si_3N_4$ or SiC can be employed. Here, further for the purpose of obtaining the high thermal conductivity, it is suitable to decrease the porosity of the honeycomb structure 2 (the porous body) containing silicon carbide as the main component.

Specifically, the porosity of the honeycomb structure 2 is adjusted to preferably 10% or less, more preferably 5% or less and further preferably 2% or less, and it is especially suitable to employ the above Si-impregnated SiC or (Si+Al) impregnated SiC. The SiC itself has the high thermal conductivity and is characterized in that it is easy to radiate heat, but in the case of Si-impregnated SiC, the honeycomb structure can be manufactured to have the above porosity and a sufficient strength.

For example, in a case of usual silicon carbide, its thermal conductivity is about 20 W/m·K, but when the porosity is adjusted to 2% or less, the thermal conductivity can be adjusted to about 150 W/m·K. It is to be noted that the above porosity is measured by the Archimedes' method.

Here, the above thermal conductivity of the honeycomb structure 2 is in a range of 0.1 W/m·K to 300 W/m·K, and is further preferably 100 W/m·K or more. The thermal conductivity is more preferably from 120 W/m·K to 300 W/m·K and most preferably from 150 to 300 W/m·K. When the thermal conductivity is adjusted in the above range, the heat conduction properties suitably improve, heat can efficiently be transmitted into the honeycomb structure 2, and the fluid F can rapidly be heated.

In addition, when the honeycomb structure 2 is made of silicon carbide, an electric resistivity is in a range of 0.01 Ωcm to 10 Ωcm, and is further preferably 1 Ωcm or less. The electric resistivity is more preferably 0.1 Ωcm or less and especially preferably 0.05 Ωcm or less. In consequence, it is possible to increase the heating efficiency by the electromagnetic induction heating system.

The honeycomb structure according to the present embodiment may be a structure in which a catalyst is loaded on/in at least one of the surface and the pores of the partition wall. In this way, the honeycomb structure 2 according to the present embodiment may be configured as a catalyst carrier in which a catalyst is loaded or a filter (e.g., diesel particulate filter (hereinafter, also called "DPF") and gasoline particulate filter) provided with plugging portions to purify particulate matter (carbon particulates) in exhaust gas.

It is to be noted that as a porosity of the porous body (the honeycomb structure 2 or the like), a suitably large porosity can be selected in accordance with its use application. For example, in the case of using the honeycomb structure 2 as a catalyst carrier for a car or an exhaust gas purifying filter, it is preferable that the honeycomb structure contains predetermined ceramics as a main component, to adjust the porosity in a range of 30 to 60%. When the porosity is less than 30%, a catalyst cannot efficiently be loaded, or a function of the filter unfavorably deteriorates. Furthermore, when the porosity is more than 60%, strength is not sufficiently achieved, and durability unfavorably deteriorates.

On the other hand, in the case of forming the porous body by use of cordierite as the main component, as compared with the case of forming the honeycomb structure by use of silicon carbide as the main component, the thermal conductivity decreases, but a thermal expansion coefficient can be minimized. Furthermore, specific heat is small, and hence the porous body can have an excellent thermal shock resistance. Consequently, it is possible to inhibit generation of cracks during heating, and the porous body also has an advantage of enabling a rapid temperature rise due to its small specific weight.

Here, in the case of forming the porous body by use of cordierite as the main component, it is preferable that the thermal expansion coefficient is 0.1 ppm/K or more and 2 ppm/K or less. It is to be noted that as a measuring method of the thermal expansion coefficient, for example, there can be employed a method of cutting out, from the porous body, a test piece having a length of 10 mm or more along the passing direction of the fluid F and having an area of 1 mm$^2$ or more and 100 mm$^2$ or less of a cross section including a direction perpendicular to this passing direction, and measuring the thermal expansion coefficient of this test piece in the passing direction with a differential thermal dilatometer by use of quartz as a standard comparison sample.

Figure 15:
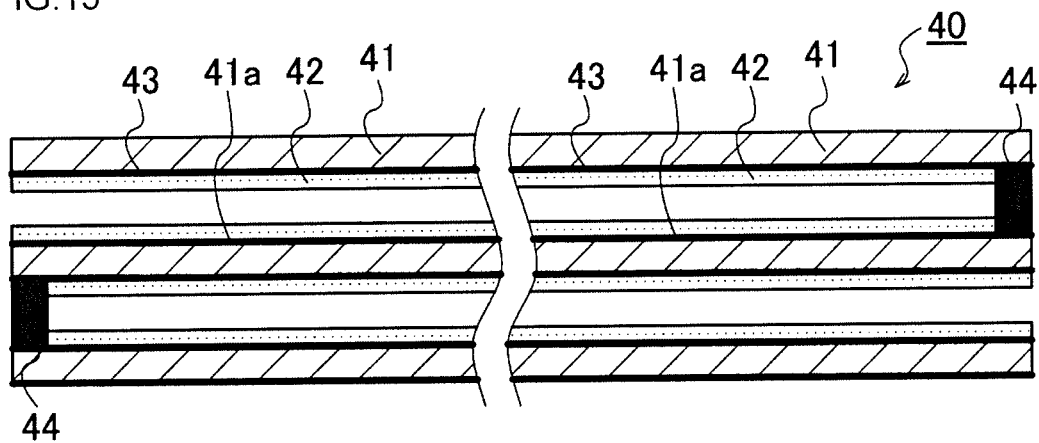
FIG. 15 is a partially enlarged end view showing an example of the schematic configuration of a surface layer and a conductive coating layer formed on a partition wall of a honeycomb structure.
Figure 16:
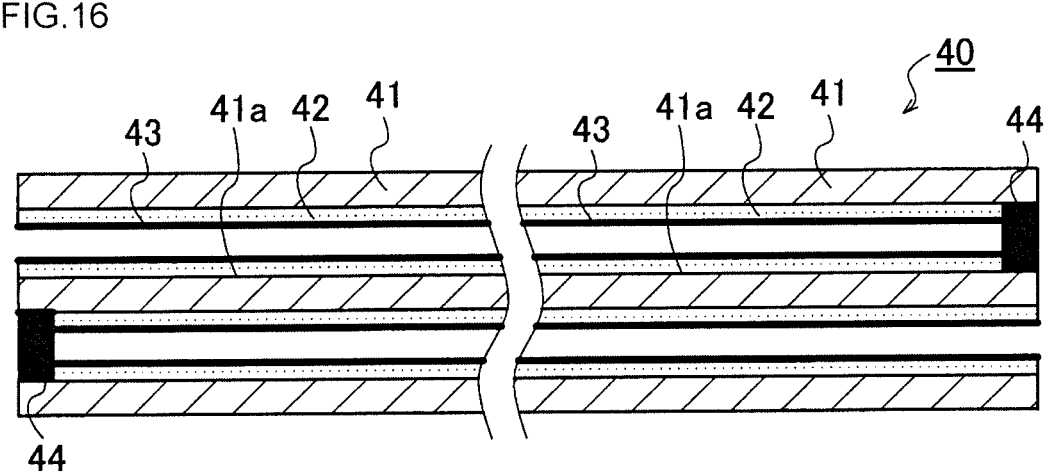
FIG. 16 is a partially enlarged end view showing an example of the schematic configuration of the surface layer and the conductive coating layer formed on the partition wall of the honeycomb structure.

When a honeycomb structure 40 is used as a catalyst carrier or an exhaust gas purification filter for an automobile, at least a portion of a partition-wall surface 41a of a partition wall 41 thereof may include a surface layer 42 that has breathability. The material of the surface layer 42 is not particularly limited, and can be appropriately selected from among materials such as ceramics, metal, and CMC (ceramic matrix composite) if needed (see FIGS. 15 and 16). Herein, FIGS. 15 and 16 are partially enlarged end views respectively showing examples of the schematic configuration of the surface layer 42 and a conductive coating layer 43 formed on the partition wall 41 of the honeycomb structure 40.

The surface layer 42 may be a single layer or multiple layers. The surface layer 42 may be formed on the conductive coating layer 43 formed on the partition-wall surface 41a of the partition wall 41 (see FIG. 15) or the conductive coating layer 43 may be formed on the surface layer 42 formed on the partition-wall surface 41a of the partition wall 41 (see FIG. 16). Herein, to have breathability means that the permeability of the surface layer 42 is 1.0×10$^{-13}$ m$^2$ or more. From the viewpoint of further reducing the pressure loss, it is preferable that the permeability is 1.0×10$^{-12}$ m$^2$ or more. Because the surface layer 42 has breathability, the pressure loss due to the surface layer 42 can be suppressed.

In the present specification, "permeability" means a physical property value computed by the following Equation 1 and is an indicative value indicating a passing resistance when predetermined gas passes through a corresponding object (partition wall). Herein, in the following Equation 1, C indicates a permeability (m$^2$), F indicates a gas flow rate (cm$^3$/s), T indicates a sample thickness (cm), V indicates a gas viscosity (dynes·sec/cm$^2$), D indicates a sample diameter (cm), and P indicates a gas pressure (PSI). In addition, numeric values in the following Equation 1 indicate "13.839 (PSI)=1 (atm)" and "68947.6 (dynes·sec/cm$^2$)=1 (PSI)".

$$C = \frac{8FTV}{\pi D^2(P^2 - 13.839^2)/13.839 \times 68947.6} \times 10^{-4} \quad \text{[Equation 1]}$$

When measuring the permeability, the permeability is measured in the state where the surface layer 42 is present by cutting out the partition wall 41 with the surface layer 42 and then the permeability is measured in the state where the surface layer 42 is scraped off, and the permeability of the surface layer 42 is calculated from these measurement results of the permeability and a ratio between the thickness of the surface layer 42 and the thickness of the partition wall 41.

Additionally, there are not any special restrictions on a shape of the cells of the honeycomb structure, and the cell shape can arbitrarily be selected from the group consisting of a round shape, an elliptic shape and polygonal shapes such as a triangular shape, a quadrangular shape and a hexagonal shape. For example, a honeycomb structure may be used in which cells are radially arranged, and a conductive coating layer may be formed on the surfaces of through channels through which a fluid passes in the honeycomb structure. Alternatively, a honeycomb structure including end faces having a donut shape may be used (not shown). Additionally, an outer shape of the honeycomb structure, an outer circumferential wall thickness, an inner circumferential wall thickness, a cell density, a partition wall thickness of partition walls, a partition wall density and others can arbitrarily be set.

When the honeycomb structure includes the conductive coating layer 4 on the surfaces of the through channels through which the fluid passes, the honeycomb structure does not necessarily have to include the conductive coating layers 4 on all of the surfaces of the through channels (the cells 3), and may include the conductive coating layers 4 on a part of the surface of each through channel. In this case, the cells 3 to be formed with the conductive coating layers 4 can arbitrarily be designated on the basis of a predetermined pattern (see FIGS. 4A, 4B and 4C). Here, FIG. 4A and others schematically show the cut surface of the fluid heating component 1.

Figure 4A:
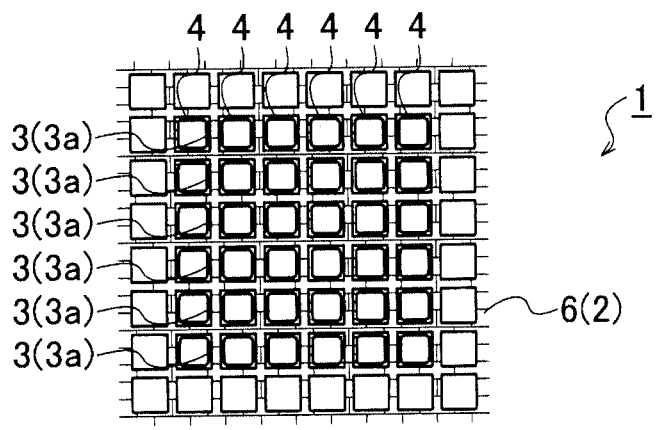
FIG. 4A is an explanatory view showing one example of an arrangement pattern of a conductive coating layer.
Figure 4B:
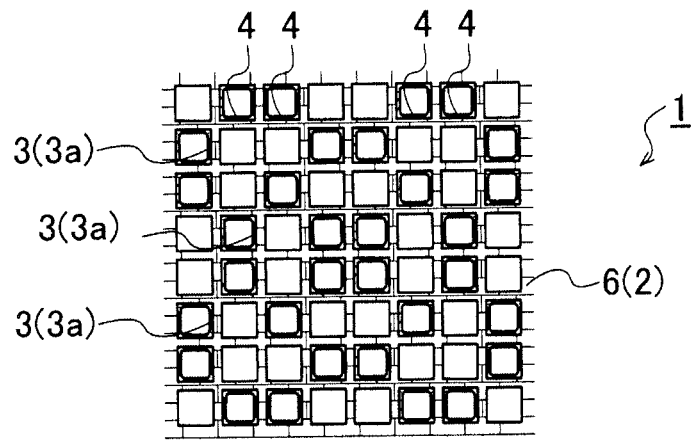
FIG. 4B is an explanatory view showing another example of the arrangement pattern of the conductive coating layer.
Figure 4C:
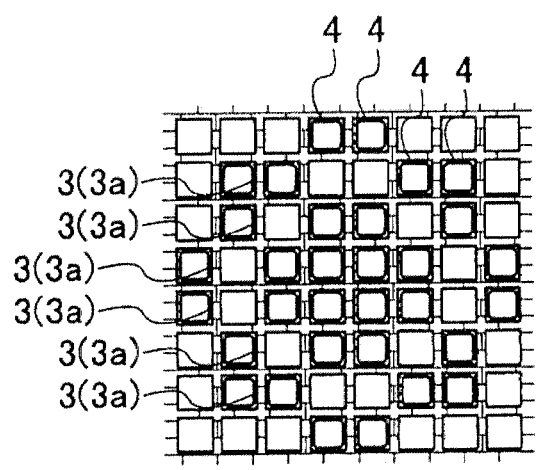
FIG. 4C is an explanatory view showing still another example of the arrangement pattern of the conductive coating layer.

FIG. 4A shows a case where it is assumed that the fluid easily flows in the vicinity of the center of the fluid heating component 1, and shows that the conductive coating layer 4 is formed only on the surfaces of the cells 3 positioned in the vicinity of the center. Consequently, it is possible to efficiently heat the fluid flowing in the vicinity of the center. On the other hand, each of FIG. 4B and FIG. 4C shows a case where it is predicted that a temperature heightens especially in the vicinity of a circumference of the fluid heating component 1 by induction heating. In this case, a heating balance between the vicinity of the center of the fluid heating component 1 (an inner portion) and the vicinity of the circumference thereof (an outer portion) is taken into consideration in arranging the respective conductive coating layers 4. Consequently, in the arrangement of the conductive coating layers 4, the conductive coating layers 4 may be arranged regularly along the predetermined pattern, or the cells 3 to be provided with the conductive coating layers 4 may be selected at random. Furthermore, when the conductive coating layer 4 is disposed on the surface of each cell 3, a thickness of each coating layer can arbitrarily be changed.

That is, a coating layer thickness of the conductive coating layer 4 disposed on the surface of each cell 3 in the vicinity of the circumference can be adjusted to be smaller (or larger) than the coating layer thickness of the conductive coating layer 4 disposed on the surface of each cell 3 in the vicinity of the center. In consequence, the heating balance between the vicinity of the center and the vicinity of the circumference can further be adjusted.

For example, when the conductive coating layer 4 is disposed on the surfaces of all the through channels (cells 3), there is a possibility of occurrence of a phenomenon where the conductive coating layer 4 close to an induction heating coil is efficiently heated and the heating efficiency of the conductive coating layer 4 of the inner portion (the vicinity of the center) of the fluid heating component 1 decreases. This is because it is predicted that when the current flows through the conductive coating layer, a magnetic field which repels a magnetic field generated by the induction heating coil is generated, and the magnetic fields offset each other. Therefore, in the case of especially heating an inner side of the fluid heating component 1, the conductive coating layer 4 is not disposed on the surfaces of parts of the cells 3 in the vicinity of the circumference so that the above-mentioned offset phenomenon of the magnetic fields does not occur. Alternatively, a region to be provided with the conductive coating layer 4 may be locally limited, so that the magnetic field generated by the induction heating coil reaches the inner portion of the fluid heating component 1.

On the other hand, when the conductive pore portion coating layer 7 is disposed on an inner side of the pore portion (a pore inner circumferential surface) of the porous body (the honeycomb structure 2), the conductive pore portion coating layer may be formed in all the pore portions. Alternatively, the conductive pore portion coating layer 7 may be formed in at least parts of the pore portions. In this case, positions of regions (the partition walls 6) to be provided with the conductive pore portion coating layer 7 can arbitrarily be designated on the basis of the predetermined pattern (see FIGS. 5A, 5B and 5C). Here, FIG. 5A and others schematically show the cut surface of the fluid heating component 1.

Figure 5A:
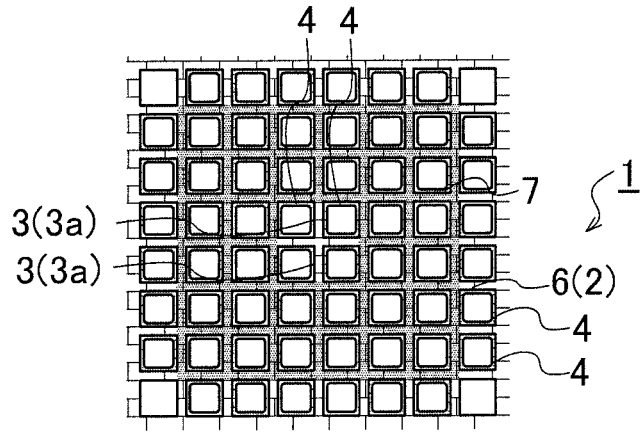
FIG. 5A is an explanatory view showing one example of an arrangement pattern of a conductive pore portion coating layer.
Figure 5B:
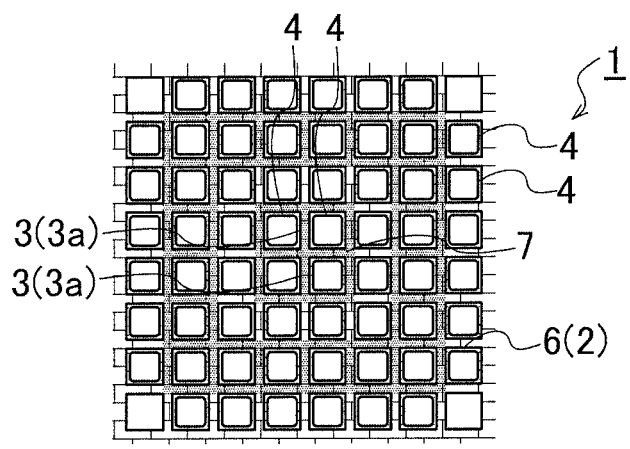
FIG. 5B is an explanatory view showing another example of the arrangement pattern of the conductive pore portion coating layer.
Figure 5C:
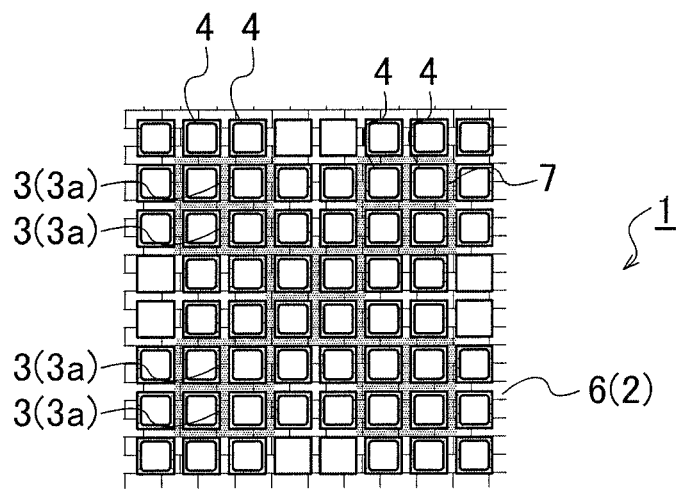
FIG. 5C is an explanatory view showing still another example of the arrangement pattern of the conductive pore portion coating layer.

In an example shown in FIG. 5A, the conductive coating layer 4 is only disposed in the cells 3 in the vicinity of the center of the fluid heating component 1, and the conductive pore portion coating layer 7 is not disposed in the partition walls 6 which define the cells 3. Furthermore, both the conductive coating layer 4 and the conductive pore portion coating layer 7 are disposed in an outer region (an intermediate region) from the vicinity of the center, and furthermore, the conductive coating layer 4 is only disposed only in the vicinity of the circumference of the fluid heating component 1 again. In an example of FIG. 5B, conversely to the example of FIG. 5A, the conductive coating layer 4 and the conductive pore portion coating layer 7 are disposed on the surfaces of the cells 3 in the vicinity of the center, and then, a region only of the conductive coating layer 4 and a region of the conductive coating layer 4+ the conductive pore portion coating layer 7 are alternately disposed toward the vicinity of the circumference. FIG. 5C shows another example of a region formed with the conductive pore portion coating layer 7. In these examples, adjustment of the heating balance between the vicinity of the center and the vicinity of the circumference is achieved in the same manner as in the fluid heating component 1 shown in, for example, FIG. 4A.

The conductive coating layer 4 and the conductive pore portion coating layer 7 (hereinafter referred to as "the conductive coating layer 4 and others") can be formed on the cell surfaces 3a of the cells 3 of the honeycomb structure 2 by a well-known method such as a plating method, a vacuum deposition method, a metallizing method or a chemical vapor deposition (CVD) method. For the purpose of uniformly decreasing the coating layer thickness to form the conductive coating layer 4 and others which do not have any defects, it is preferable to employ the plating method or the CVD method. It is to be noted that a manufacturing method of the fluid heating component which includes a forming method of the conductive coating layer 4 and others will be described later in detail.

There are not any special restrictions on a material constituting the conductive coating layer 4 and others, but, for example, in a case of the plating method, well-known materials such as Ni, Ni—P, Ni—Fe, Ni—W, Ni—B—W, Ni—Co, Ni—Cr, Ni—Cd, Ni—Zn, Cr, another chromate treated coating, Co—W, Fe—W, Fe—Cr, Cr—C and Zn—Fe can be combined and used.

Furthermore, in addition to the above materials, metal elements such as tin (Sn), zinc (Zn), gold (Au), silver (Ag), copper (Cu), platinum (Pt), rhodium (Rh), palladium (Pd) and cadmium (Cd) are usable. Additionally, if necessary, carbides (silicon carbide, tungsten carbide, chromium carbide, boron carbide, etc.), oxides (alumina, silica, zirconia, tungsten oxide, titanium dioxide, molybdenum dioxide, etc.), graphite, boron nitride and various functional particles may be composited. Moreover, one of preferable configurations is to perform a sealing treatment if necessary. Thus, the sealing treatment is performed to improve a heat resistance, rust preventive properties and the like, and it is possible to improve the durability of the fluid heating component.

On the other hand, in a case of forming the conductive coating layer 4 and others by the CVD method, there are not any special restrictions on the method, but, for example, a metal CVD method, a plasma CVD method, a thermal CVD method or the like is usable.

Here, as already described, at least a part of the conductive coating layer 4 and others is required to be electrically connected along the cell surfaces 3a (the through channel surfaces) of the cells 3 of the honeycomb structure 2 in the cut surface of the honeycomb structure 2 which is perpendicular to the passing direction of the fluid F (the axial direction A of the honeycomb structure 2) (see FIG. 2). As described above, the fluid heating component of the present invention is heated from the outside by the electromagnetic induction heating system, and a heating means is not disposed in the fluid heating component 1 itself.

Therefore, when a region which is not electrically connected (which is electrically interrupted and intermittent) is present along the cell surfaces 3a, because a heating speed becomes slow due to the bad efficiency of induction heating in the region and thus more output is required or considerably high frequency is required in order to heat to a predetermined temperature, it is not preferable for a product for vehicle installation of an automobile etc. due to the upsizing or expensiveness of an electromagnetic induction heating device. Moreover, there is a possibility of occurrence of a defect such that local heating or electric discharge is generated. For the purposes of preventing these situations, enabling uniformly efficient heating in the whole fluid heating component 1 and inhibiting the occurrence of the electric discharge, at least a part of the region is electrically connected along the cell surfaces 3a. For a reason similar to the above reason, it is necessary that the conductive coating layer 4 and the conductive pore portion coating layer 7 are electrically connected.

Figure 6:
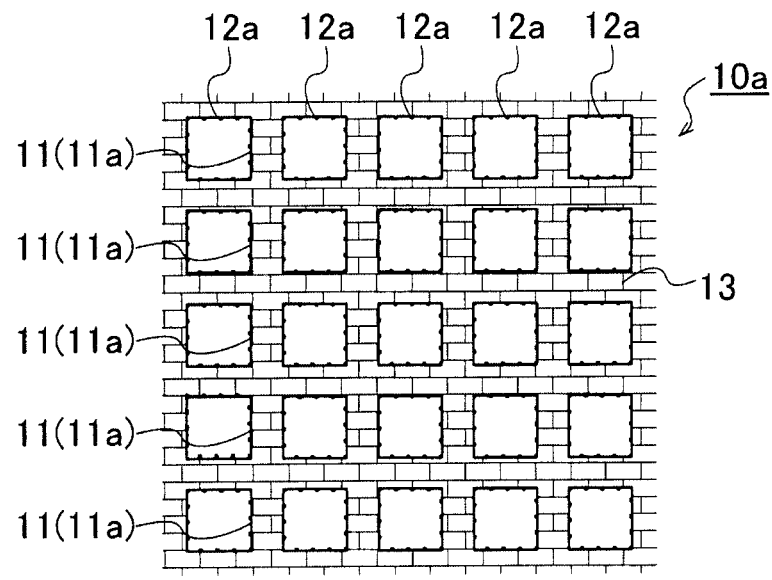
FIG. 6 is a partially enlarged sectional view showing one example of an incompatible fluid heating component.
Figure 7:
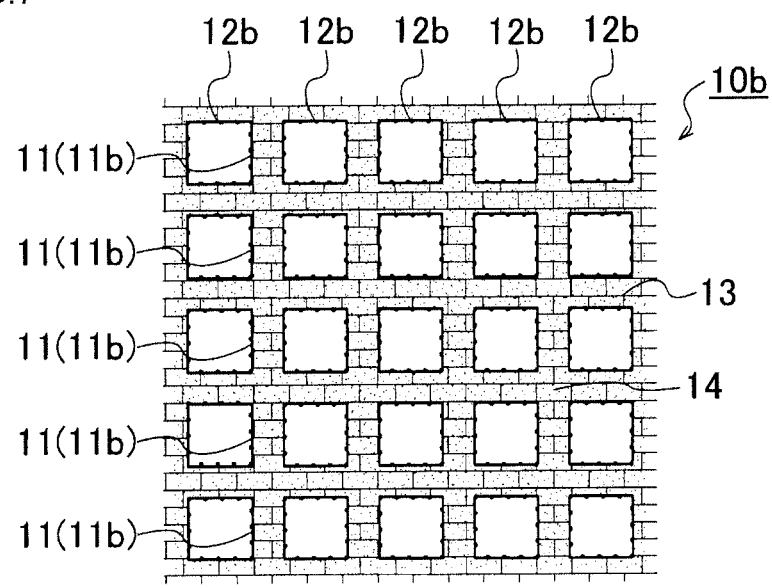
FIG. 7 is a partially enlarged sectional view showing another example of the incompatible fluid heating component.

Here, FIG. 6 and FIG. 7 show examples of incompatible fluid heating components 10a and 10b, respectively. Specifically, in a case of the fluid heating component 10a of FIG. 6, a conductive coating layer 12a is formed to coat cell surfaces 11a of cells 11, but the conductive coating layer 12a is interrupted in a part of the cell surface 11a, and a cut surface of the fluid heating component does not have a ring shape. That is, the conductive coating layer 12a is formed discontinuously via a predetermined space.

On the other hand, in a case of FIG. 7, a conductive coating layer 12b to coat a cell surface 11b of each cell 11 is discontinuously formed in a cut surface of the fluid heating component, and a conductive pore portion coating layer 14 formed in a pore portion (not shown) of a partition wall 13 is not electrically connected to the conductive coating layer 12b. That is, this example has a state similar to that of FIG. 6. Consequently, in heating by an electromagnetic induction heating system, local deflection occurs in a temperature distribution during the heating of the fluid heating component 10a or 10b, and the whole fluid heating component 10a or 10b cannot uniformly be heated.

Furthermore, the conductive coating layer 4 and/or the conductive pore portion coating layer 7 may possess a multilayer structure. For example, the coating layer may be constituted of an abutment layer which abuts on the cell surface 3a of each cell 3 of the honeycomb structure 2, and at least one superimposed layer laminated on the abutment layer. It is to be noted that to suitably adjust bonding properties to the cell surfaces 3a of the cells 3 of the honeycomb structure 2, the above abutment layer is especially suitably an electroless plating layer which is formed by electroless plating and which has a good compatibility with a ceramic material, a small thermal expansion coefficient and a low hardness and which does not react with the ceramic material (silicon carbide, cordierite or the like) formed as the substrate at a high temperature.

On the other hand, each superimposed layer laminated on the above electroless plating layer may be specialized in characteristics required for the conductive coating layer 4 or the conductive pore portion coating layer 7. For example, the superimposed layers may include at least an induction heating layer made of a ferromagnetic material to perform the electromagnetic induction heating, and may further include a heat resistant layer superimposed on the induction heating layer and containing at least one metal element selected from the group consisting of Cr, Si, Al, Ni, W, B, Au, Rd, PD and Pt which are excellent in heat resistance, corrosion resistance and thermal shock resistance. Consequently, the whole conductive coating layer can produce an effect that the layer is excellent in, for example, bonding properties to the porous body, heating properties, and heat resistance. It is to be noted that FIG. 1 to FIG. 11 show each of the conductive coating layer 4 and others as a single layer to simplify the drawings.

The coating layer thickness of the conductive coating layer 4 is from 0.1 μm to 500 μm, further preferably from 0.3 μm to 200 μm, more preferably from 0.5 μm to 50 μm, and especially preferably from 0.5 μm to 10 μm. When the coating layer thickness of the conductive coating layer 4 is adjusted in the above range, it is possible to inhibit peeling from the cell surfaces 3a or cracks of the honeycomb structure 2 also due to a difference in thermal expansion coefficient between the conductive coating layer and the honeycomb structure 2. When the coating layer thickness is excessively large, a defect such as the above peeling easily occurs, a heat capacity increases more than necessary, and a resistance decreases. Therefore, the heating efficiency or heating speed might deteriorate. On the other hand, when the coating layer thickness is excessively small, there occurs the problem that the heating efficiency by the electromagnetic induction heating system remarkably decreases. Therefore, it is necessary to adjust the coating layer thickness of the conductive coating layer 4 in the above range.

It is to be noted that a coating layer thickness of the conductive pore portion coating layer 7 having the above-mentioned multilayer structure is from 0.1 μm to 10 μm, further preferably from 0.1 μm to 5 μm, further preferably from 0.3 μm to 3 μm, and especially preferably from 0.5 μm to 1 μm. When the coating layer thickness of the conductive pore portion coating layer 7 is adjusted in the above range, it is possible to inhibit the peeling from the cell surfaces 3a or the cracks of the honeycomb structure 2 also due to the difference in thermal expansion coefficient between the coating layer and the honeycomb structure 2. Furthermore, when the coating layer thickness is excessively large, a defect occurs in porous characteristics, whereas when the coating layer thickness is excessively small, there occurs the problem that the heating efficiency by the electromagnetic induction heating system remarkably decreases. Therefore, it is necessary to adjust the coating layer thickness of the conductive pore portion coating layer 7 in the above range.

2. Manufacturing Method of Fluid Heating Component

Figure 8:
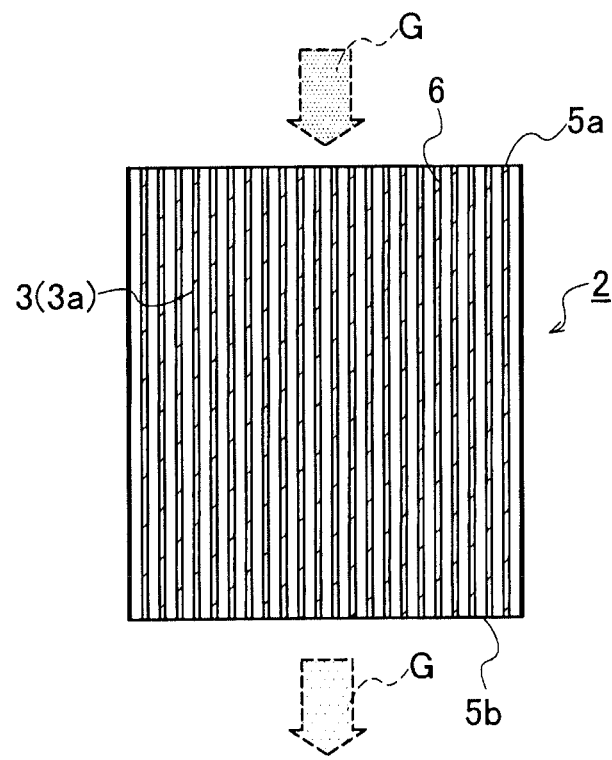
FIG. 8 is an explanatory view schematically showing one example of a manufacturing method of the fluid heating component.

Next, description will be made as to one example of a manufacturing method of the fluid heating component 1 (or the fluid heating component 1a). In the fluid heating component 1 and others, the conductive coating layer 4 is formed on the cell surfaces 3a of the cells 3 of the honeycomb structure 2 of the porous body by use of the already described plating method, CVD method or the like. In this case, as shown in FIG. 8, a raw material fluid G such as a gas or a liquid which forms a raw material of the conductive coating layer 4 is passed through the honeycomb structure 2 from the one end face 5a of the honeycomb structure 2 toward the other end face 5b thereof, to bring the raw material fluid G into contact with the cell surfaces 3a (a raw material fluid passing step). In this state, a coating is formed on the cell surfaces 3a by the above plating method, CVD method or the like, so that the conductive coating layer 4 can be disposed.

Figure 9:
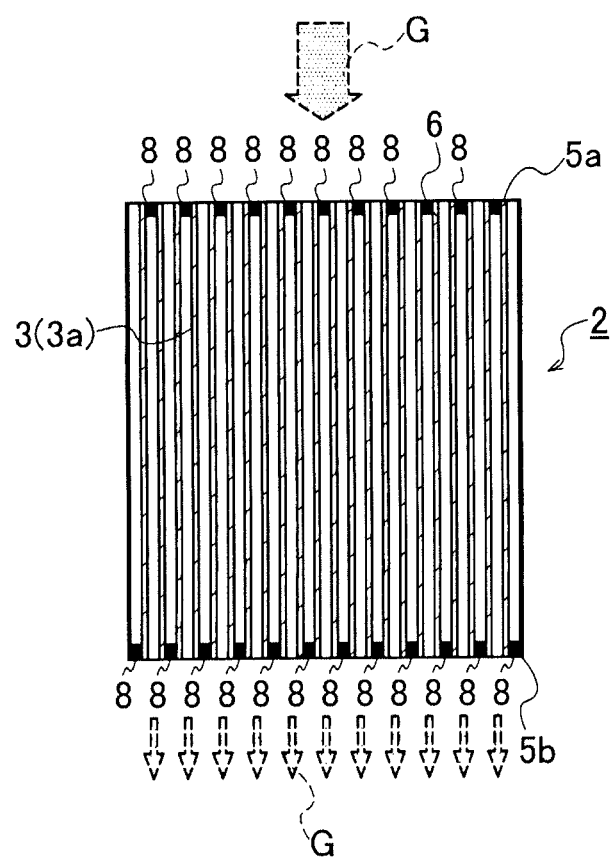
FIG. 9 is an explanatory view schematically showing one example of a manufacturing method of another example of a constitution of the fluid heating component.

Furthermore, when the conductive pore portion coating layer 7 is disposed in the pore portions of the partition walls 6, plugging portions 8 are previously disposed to the cells 3 opened in the one end face 5a of the honeycomb structure 2 in accordance with a predetermined arrangement standard, and a plurality of plugging portions 8 are similarly disposed to the residual cells 3 of the other end face 5b (a plugging step, see FIG. 9).

In this state, the raw material fluid G is passed through the honeycomb structure 2 in the same manner as described above with reference to FIG. 8. In this case, parts of the cells 3 are closed with the plugging portions 8, and hence the raw material fluid G flows through the porous partition wall 6 into the adjacent cell 3, and is discharged from the other end face 5b. Consequently, the conductive pore portion coating layer 7 can be formed in the pore portions of the partition walls 6 by the raw material fluid G which passes the partition walls 6. It is to be noted that a forming method of the plugging portions 8 and a forming method of the conductive coating layer 4 and the conductive pore portion coating layer 7, for example, the plating method or the CVD method are originally well known, and hence details of the methods are omitted here.

When the plugging portions 8 are not disposed in the honeycomb structure 2, each of the one end face 5a and the other end face 5b of the honeycomb structure 2 is covered with a well-known plugging jig (not shown), and then the raw material fluid G can be passed through the porous partition wall 6 of the honeycomb structure into the adjacent cell 3. Afterward, the plugging jig is removed from the one end face 5a and others after the conductive coating layer 4 and others are formed, so that the conductive pore portion coating layer 7 can be obtained without forming the plugging portions.

The conductive coating layer 4 and the conductive pore portion coating layer 7 (hereinafter referred to as "the conductive coating layer 4 and others") can be formed to the cell surfaces 3a of cells 3 or the pore portions of the partition walls 6 of the honeycomb structure 2 by a well-known method, for example, the plating method, the vacuum deposition method, the metallizing method or the chemical vapor deposition (CVD) method. For the purpose of uniformly adjusting the coating layer thickness to form the conductive coating layer 4 and others which do not have any defects, it is preferable to employ the plating method or the CVD method. These methods are already well known. Moreover, when the methods are performed, there is a merit of enabling the formation of the layers at low cost.

Alternatively, a place through which the raw material fluid G passes may be limited. For example, the raw material fluid G is passed only through a central portion of the honeycomb structure, so that the conductive coating layer 4 and others can be formed only in the central portion as described above. Specifically, a pattern of the place through which the raw material fluid G passes is developed, or the conductive coating layer 4 and others are formed in several divided stages, so that the conductive coating layer 4 and others having different thicknesses can be formed at optional positions (see FIGS. 4A, B and C, FIGS. 5A, B and C and others).

When a surface layer having the breathability is formed on at least a part of the surface of the partition wall of the honeycomb structure, it is preferable that the surface layer covers at least one surface of the partition wall. A method of forming the surface layer mainly includes the following three methods.

The first method is a method of pouring slurry including surface layer forming particles and bonding materials containing metal or glass as a main component into the cells of the honeycomb structure to form a coating film and heating the coating film at a temperature not less than the melting point of metal or the softening point of glass to form a surface layer.

The second method is a method of pouring slurry including surface layer forming particles and adhesive materials containing silica or alumina as a main component into the cells of the honeycomb structure to form a coating film and heating the coating film to solidify the silica or alumina so as to form a surface layer.

The third method is a method of pouring gas including surface layer forming particles and the bonding materials or the adhesive materials into the cells of the honeycomb structure or pouring gas including only the surface layer forming particles into the cells of the honeycomb structure to form a coating film and heating the coating film to form a surface layer.

For example, pouring slurry into the cells of the honeycomb structure only needs to cause slurry to flow through the cells of the honeycomb structure or to dip slurry in the cells of the honeycomb structure. Herein, when bonding materials containing metal or glass as the main component are used as slurry, because the slurry is required to be melted or softened once at a temperature not more than the heat-resistant temperature of the honeycomb substrate during manufacturing, it is preferable to heat the coating film at a temperature not less than the melting point or the softening point of the bonding materials.

Moreover, because the maximum temperature arrives at approximately 700° C. in the usage environment of the honeycomb structure, it is preferable to use metal or glass that has the melting point or the softening point not less than the above temperature. The specific melting point or softening point is 800 to 1200° C., for example.

On the other hand, when adhesive materials containing silica or alumina as the main component are used as slurry, it is preferable that the adhesive materials can be solidified by heating and drying during manufacturing. For example, the adhesive materials that can be solidified by heating and drying may include colloidal dispersion of silica or alumina, or may include colloidal dispersion that includes silica and alumina.

Moreover, because the maximum temperature in the usage environment of the honeycomb structure arrives at approximately 700° C., it is more preferable to use silica or alumina having a heat-resistant temperature not less than the above temperature. The coating film is formed by attaching a suction jig to the downstream of the honeycomb structure after pouring slurry into the cells of the honeycomb structure and performing suction from the other open end that is the downstream side of the honeycomb structure to remove excess moisture. As conditions for heat treatment of the coating film, it is preferable to heat the coating film at the temperature of 800 to 1200° C. and for 0.5 to 3 hours.

When adhesive materials containing alumina and silica as the main component are used as slurry, the process of pouring the slurry into the cells may be performed at the stage of honeycomb molding and drying. In this case, after slurry is poured into the cells and then the honeycomb structure before forming the surface layer is dried, a process of fixing the surface layer forming particles to the adhesive materials to form the surface layer is simultaneously performed in the firing process of the honeycomb structure.

It is preferable that silica or alumina has the effect of solidifying by drying. Moreover, in addition to adding the bonding materials containing the metal and glass as the main component, bonding materials containing metal or glass as the main component may be previously coated on the surface layer forming particles. Moreover, a process of forming composite particles that include surface layer forming particles and bonding materials may be provided.

The slurry can be obtained by mixing, for example, surface layer forming particles, "the adhesive materials or the bonding materials", an organic binder, and "water or alcohol". Furthermore, emulsification may be performed by adding fat and oil and surfactant to the slurry and mixing these. Moreover, a pore former for controlling the porosity of the surface layer may be mixed with the slurry. The pore former can employ resin particles, starch particles, carbon particles, etc. whose particle diameter is 0.5 μm to 10 μm, for example.

The method of pouring the gas including surface layer forming particles and "the bonding materials or the adhesive materials" into the cells of the honeycomb structure is to deposit the surface layer forming particles in a floating state on the surface of the partition wall by blowing gas including the surface layer forming particles into the cells at 0.005 to 0.4 liters/$cm^2$ for example. After that, the method is to fuse and fix the surface layer forming particles onto the surface of the partition wall by performing heat treatment under conditions of 800 to 1200° C. and 0.5 to 3 hours, for example, and to form the surface layer.

Moreover, when pouring gas including only the surface layer forming particles into the cells of the honeycomb structure, the method is to deposit the surface layer forming particles in a floating state on the surface of the partition wall by blowing the gas including the surface layer forming particles into the cells at 0.005 to 0.4 liters/cm$^2$ for example and then to fuse and fix the surface layer forming particles onto the surface of the partition wall by performing heat treatment under conditions of 1280 to 1330° C. and 0.5 to 3 hours to form the surface layer.

A method of pouring the above slurry or gas into the cells of the honeycomb structure as well as the method of pouring only the surface layer forming particles into the cells without using the bonding materials and adhesive materials may mix an organic binder with slurry or gas. The coating film can be temporarily fixed before the process of forming the surface layer by heating by adding an organic binder.

It is preferable that the organic binder is a material that is oxidized and removed in the oxidizing atmosphere at a temperature not more than the temperature of the process of forming the surface layer by heating, namely, at a temperature of 800° C. or less. Moreover, it is preferable to use the same binder as a binder used as a pore former during manufacturing the honeycomb structure.

3. Fluid Heating Component Complex

A monolithically constructed fluid heating component complex 30a or 30b can be formed by combining a plurality of fluid heating components of the present invention having the above constitution. Here, FIG. 10 is an exploded perspective view showing a state before the fluid heating component complex 30a is constructed, FIG. 11 is a perspective view showing a schematic constitution after the fluid heating component complex 30a of FIG. 10 is constructed, FIG. 12 is an exploded perspective view showing a state before the fluid heating component complex 30b of another example of the constitution is constructed, and FIG. 13 is a perspective view showing a schematic constitution after the fluid heating component complex 30b of FIG. 12 is constructed.

Figure 10:
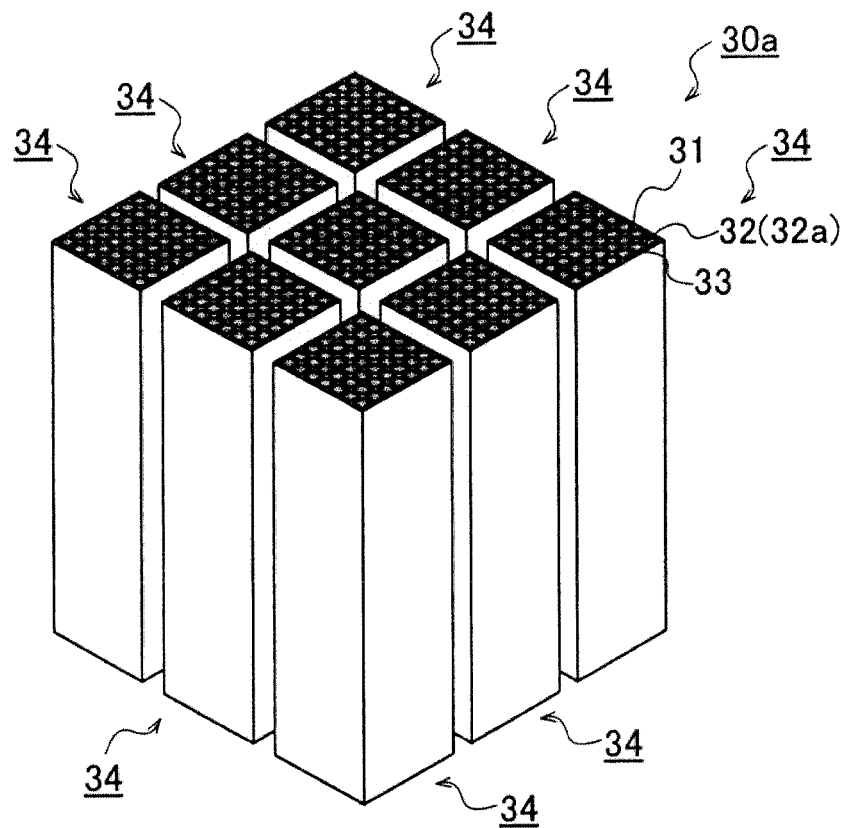
FIG. 10 is an exploded perspective view showing a schematic constitution of a fluid heating component complex.
Figure 11:
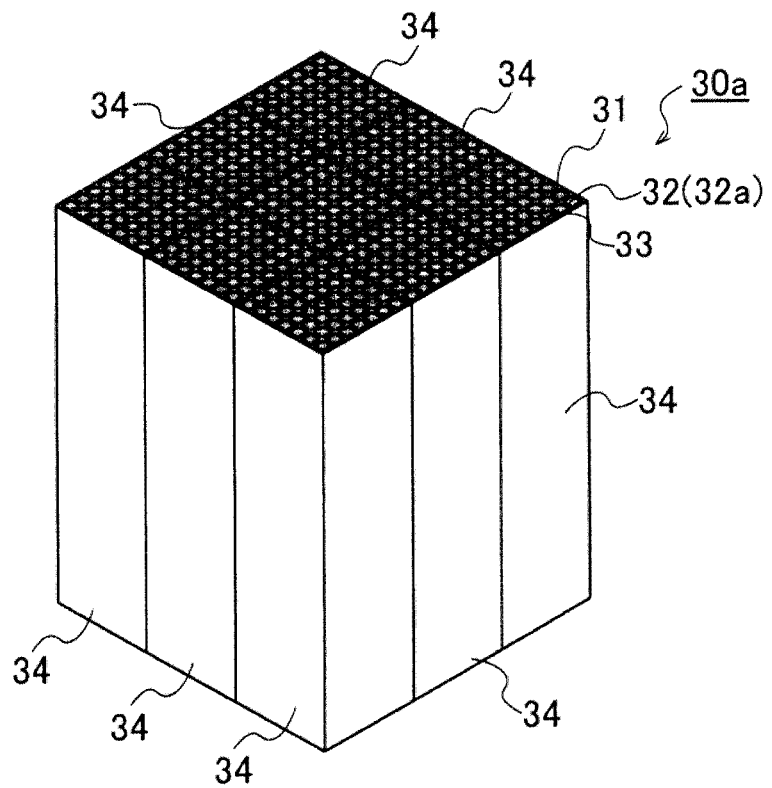
FIG. 11 is a perspective view showing the schematic constitution of the fluid heating component complex of FIG. 10.

As shown in FIG. 10 and FIG. 11, the fluid heating component complex 30a is constituted of a plurality of combined fluid heating components 34 each of which includes a prismatic columnar honeycomb structure 31 and a conductive coating layer 33 formed along cell surfaces 32a of cells 32 of the honeycomb structure 31.

That is, nine fluid heating components 34 having the same shape are used and combined in three vertical components× three horizontal components so that mutual side circumferential surfaces of the honeycomb structures 31 face each other. It is to be noted that a well-known adhesive agent or the like to bond ceramic materials to each other is used in bonding the fluid heating components 34, and hence detailed description is omitted here. Consequently, the fluid heating component complex is formed which can be used in a heating system of, for example, a large car or a machine tool. Also in this case, the respective conductive coating layers 33 are electrically connected in a cut surface of the complex which is perpendicular to a passing direction of a fluid F.

Figure 12:
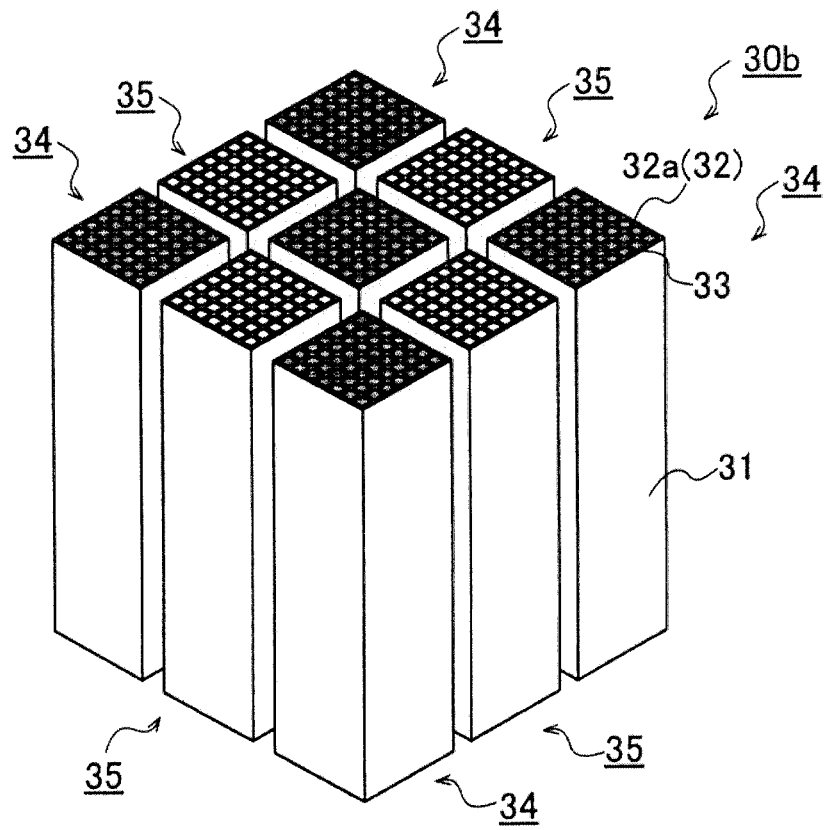
FIG. 12 is an exploded perspective view showing another example of the schematic constitution of the fluid heating component complex.
Figure 13:
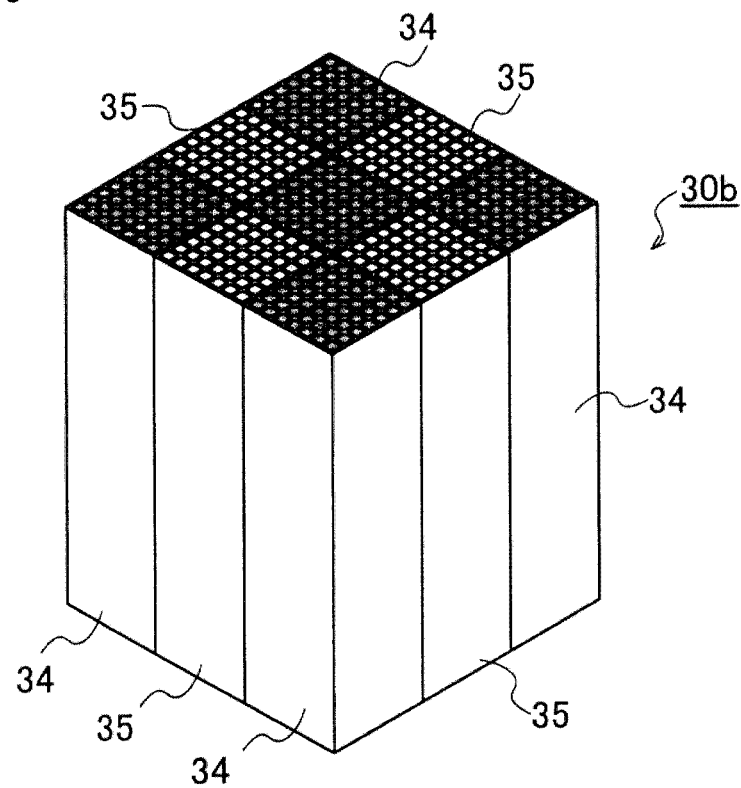
FIG. 13 is a perspective view showing the schematic constitution of the fluid heating component complex of FIG. 12.

Furthermore, the fluid heating component complex 30b of the other example of the constitution shown in FIG. 12 and FIG. 13 may be constituted. In the fluid heating component complex 30b of the other example of the constitution, five prismatic columnar fluid heating components 34 and four prismatic columnar honeycomb structures 35 which do not have conductive coating layers and conductive pore portion coating layers are alternately arranged and combined in three vertical components× three horizontal components. Also in this case, the fluid F can efficiently be heated by an electromagnetic induction heating system. It is to be noted that the same constitution as in the fluid heating component complex 30a shown in FIG. 10 and FIG. 11 is denoted with the same numerals, and description thereof is omitted.

EXAMPLES (1) Honeycomb Structure

A honeycomb structure containing SiC or cordierite as a main component was manufactured. Initially, SiC powder or cordierite forming raw material adjusted in a predetermined particle size and in an amount to be prepared, a binder, water, and others were kneaded to obtain a forming raw material, and the forming raw material was extruded into a desirable shape and dried to obtain a honeycomb formed body. Afterward, the honeycomb formed body was suitably processed and fired at a high temperature, to obtain a honeycomb structure containing a substrate of SiC or cordierite. In this case, the honeycomb structure having sizes of a honeycomb diameter of 43 mm and a honeycomb length of 23 mm in an axial direction was used regarding SiC, and the honeycomb structure having sizes of a honeycomb diameter of 82 mm and a honeycomb length of 85 mm in the axial direction was used regarding cordierite. A manufacturing method of the honeycomb structure is well known, and hence detailed description is omitted. A blend ratio or the like of the forming raw material was changed, to adjust a porosity of the honeycomb structure to 35% in Examples 1 and 2 and Comparative Examples 2 and 3. On the other hand, in Example 3 and Comparative Example 1, Si impregnation and firing were performed to adjust a porosity of each honeycomb structure to 2% or less. Moreover, in Examples 4 to 6 and Comparative Examples 4 to 7, adjustment was performed so that the porosity of the honeycomb structure is 45%.

(2) Manufacturing of Fluid Heating Component (Formation of Conductive Film Layer)

A conductive coating layer was formed to cell surfaces of cells of each SiC honeycomb structure obtained by the above (1). Here, in Example 1, Ni—P plating was performed to form the conductive coating layer, and in Examples 2 and 3, Ni—B plating was performed. In each example, in a cut surface of through channels (the cells) which was perpendicular to a passing direction of a fluid, the formed conductive coating layer was disposed on the cell surfaces of the cells of the cut surface of the through channels, in a state where the layer was electrically connected. Additionally, a coating layer thickness of the conductive coating layer in each of Examples 1 to 3 was adjusted to about 2 μm on the cell surfaces. It is to be noted that details of the plating are well known, and hence the description thereof is omitted here. On the other hand, in Comparative Examples 1 and 2, conductive coating layers were not formed. Furthermore, in Comparative Example 3, a conductive coating layer was formed intermittently to through channels (cells) in a passing direction of a fluid, and in a cut surface of the through channels (the cells) which was perpendicular to the passing direction of the fluid, the conductive coating layer was disposed on cell surfaces of the cells of the cut surface of the through channels, in a state where the layer was not electrically connected.

Examples 4 to 6 employed a cordierite honeycomb structure. The cordierite honeycomb structure has a multilayer structure in which a surface layer having breathability is formed on the cell surfaces of the honeycomb structure and a conductive coating layer is disposed on the surface layer. Herein, the surface layer was formed by coating and drying slurry with a bonding agent (glass) and oxide particles such as silica, alumina, and magnesia as surface layer forming particles and performing predetermined heat treatment. The thickness of the surface layer was adjusted to be approximately 30 μm in any of the cell surfaces. The surface layer forming particles employed silica in Example 4, alumina in Example 5, and magnesia in Example 6.

Figure 17:
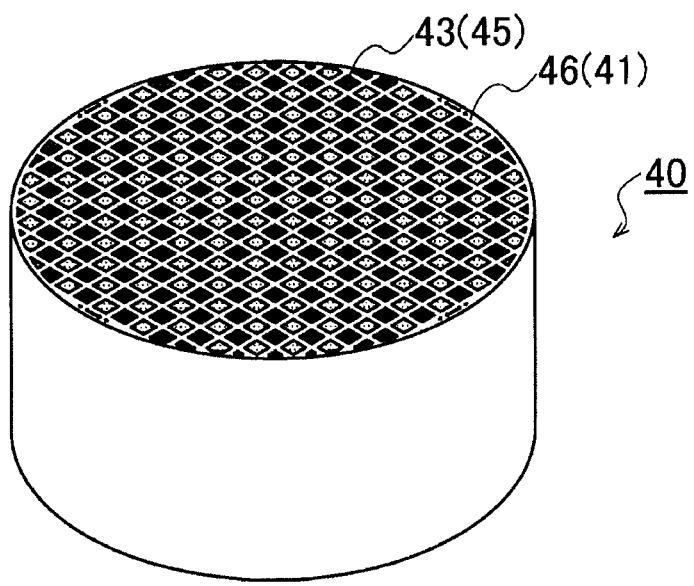
FIG. 17 is an explanatory diagram showing an example of a cut surface of a fluid and the formation of the conductive coating layer of the honeycomb structure.

Furthermore, after the surface layer was formed, the conductive coating layer 43 was formed as described below. In a cut surface 46 of through channels (cells 45) of the honeycomb structure 40 perpendicular to the passing direction A of the fluid (see FIG. 17), the coating process of the conductive coating layer 43 was performed by causing a plating solution to flow to the cells 45 spaced apart one by one to the front and back and the left and right by using one of the cells 45 as a reference. As a result, NiB plating was formed, as the conductive coating layer 43 on the surface layer, on only the cell surfaces (not shown) of the cells 45 arranged in a checkered pattern (checkerboard pattern) to which the plating solution is flowed. Herein, the conductive coating layer 43 has the coating thickness of 1 to 2 μm and is coated in a state where it is electrically connected.

On the other hand, in Comparative Examples 4 and 5, except that the conductive coating layer is not formed, a cordierite honeycomb structure on which a surface layer is formed was prepared similarly to Examples 4 to 6. Moreover, in Comparative Examples 6 and 7, a cordierite honeycomb structure on which a surface layer is formed was prepared similarly to Examples 4 to 6 and a conductive coating layer was formed as described below. In the same arrangement as FIG. 17, the conductive coating layer was intermittently formed on the through channels (the cells) in the passing direction of the fluid. The conductive coating layer according to Comparative Examples 6 and 7 is disposed on the cell surfaces of the cells of the cut surface of the through channels, in a state where it is not electrically connected, in the cut surface of the through channels (the cells) perpendicular to the passing direction of the fluid.

(3) Induction Heating Test

Figure 14:
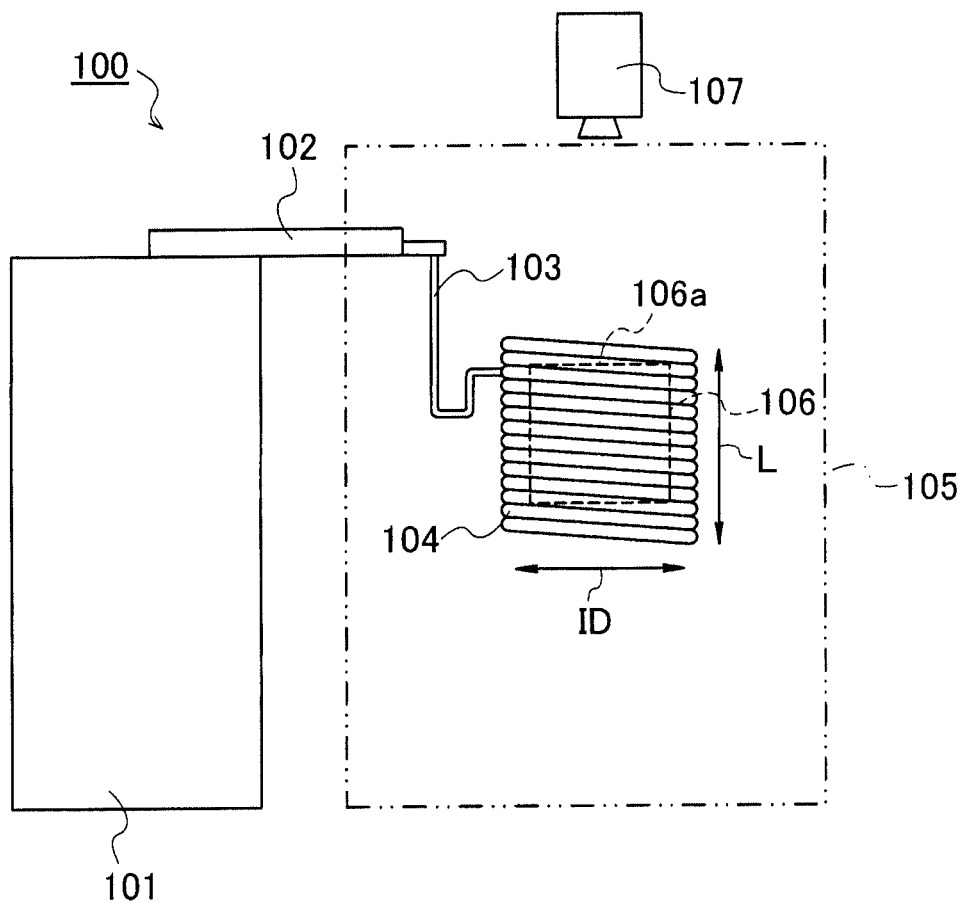
FIG. 14 is an explanatory view showing an induction heating test apparatus, and a schematic constitution of temperature measurement.

An induction heating test of each honeycomb structure as the fluid heating component was carried out by using an induction heating test apparatus 100 having a schematic constitution shown in FIG. 14. Here, the induction heating test apparatus 100 includes a high frequency power device 101 which generates a high frequency, a flexible feeder 103 electrically connected to the high frequency power device 101 through a feeder duct 102, a heating coil 104 connected to one end of the flexible feeder 103, a casing 105 disposed to surround the heating coil 104, and a thermo camera 107 disposed above a honeycomb structure 106 (a fluid heating component) stored in the heating coil 104, to measure, in a non-contact manner, a temperature of the honeycomb structure 106 (a temperature of one end face 106a) during induction heating by the heating coil 104. Here, the thermo camera 107 is also called a thermal imaging camera and, for example, a camera CPA-2300 manufactured by CHINO is usable.

In the induction heating test, initially, the honeycomb structure 106 of a test object is disposed in an inner space of the heating coil 104 of the induction heating test apparatus 100, and in this state, a high frequency current is generated from the high frequency power device 101, to pass the high frequency current through the heating coil 104 connected to the high frequency power device 101 via the feeder duct 102 and the flexible feeder 103. Consequently, a high frequency magnetic flux is generated in the heating coil 104. The honeycomb structure 106 disposed in the generated high frequency magnetic flux induces the current and is heated. In the present example, the high frequency power device 101 had a maximum output of 40 kW and a frequency of 30 to 400 kHz and a range of output control was adjusted to a range of 10% to 100%. It is to be noted that the heating coil 104 is constituted by using a round coil in which an inner diameter ID of the coil using a copper pipe is (480 mm or 100 mm and a coil length L is 200 mm. Furthermore, cooling water is passed through the copper pipe of the heating coil 104. Additionally, description of details of supply of the cooling water into the heating coil 104 is omitted here.

(4) Measuring Method of Temperature

When the induction heating test was performed by using the induction heating test apparatus 100, temperatures of a plane of the one end face 106a of the honeycomb structure 106 were measured with the thermo camera 107 disposed above the heating coil 104, and the lowest temperature (at a central position) in the measured one end face 106a was considered as a measured temperature.

(5) Test Condition 1

With respect to the SiC honeycomb structure obtained by the above (1), the frequency in the high frequency power device 101 was fixed to approximately 30 kHz and an output of the high frequency current was set to an arbitrary output value in a range of 10% to 100%, and then a heating speed was measured with the thermo camera 107 by a technique described in the above (4). Here, an induction heating output (kW) when the high frequency current was output to the heating coil 104 was calculated from numeric values of a voltmeter and an ammeter (not shown) mounted in the high frequency power device 101. Furthermore, a reaching time from the start of the output of the high frequency current until the measured temperature of the honeycomb structure 106 reached 300° C. was measured, and this time was considered as "an elapsed time". Additionally, when the time to reach 300° C. was 60 s or more or when temperature rise stopped in the middle, a reached temperature and an elapsed time at this point of time were recorded.

(6) Test Condition 2

With respect to the cordierite honeycomb structure obtained by the above (1), a heating speed was measured by the thermo camera 107 in the method shown in the above (4) by adjusting the output of the high frequency current between 10% and 100% so that the induction heating output (kW) in the high frequency power device 101 is approximately 4 kW and changing the frequency to three kinds of conditions of 30, 80, and 360 kHz. Regarding the heating speed, similarly to the test condition 1, a reaching time from the start of the output of the high frequency current until the measured temperature of the honeycomb structure 106 reaches 300° C. was measured, and this time was considered as "an elapsed time". Additionally, when the time to reach 300° C. was 60 s or more or when temperature rise stopped in the middle, a reached temperature and an elapsed time at this point of time were recorded. Tables 1 and 2 mentioned below show a summary of the test results of the above (3) to (6).

having conductivity is used, it has been confirmed that temperature finally reached 300° C. after elapse of a time of 60 s from the start of heating in an induction heating test or the temperature remained at about 50° C. even after elapse

TABLE 1

| Unit | Honeycomb structure (porous body) | | | | Conductive coating layer | | | | |
|---|---|---|---|---|---|---|---|---|---|
| | Honeycomb dia. mm | Honeycomb length mm | Substrate | Porosity of substrate % | Metal type/forming method | Film thickness μm | Induction heating output kW | Elapsed time s | Reached temp. ° C. |
| Example 1 | 43 | 23 | SiC | 35 | Ni—P/plating | 2 | 2.8 | 27 | 300 |
| Example 2 | 43 | 23 | SiC | 35 | Ni—B/plating | 2 | 3.5 | 15 | 300 |
| Example 3 | 43 | 23 | SiC | 2 or less | Ni—B/plating | 2 | 5.9 | 9 | 300 |
| Comparative Ex. 1 | 43 | 23 | SiC | 2 or less | No coating | — | 3.5 | 60 | 300 |
| Comparative Ex. 2 | 43 | 23 | SiC | 35 | No coating | — | 2.8 | 300 | 50 |
| Comparative Ex. 3 | 43 | 23 | SiC | 35 | Ni—B/intermittent | 2 | 4.8 | 300 | 100 |

*Heating conditions) induction coil: φ80, and frequency: 30 kHz of a time of 300 s. Furthermore, in a case of an intermittent

TABLE 2

| Unit | Honeycomb structure (porous body) | | | | Surface layer | Conductive coating layer | | | | |
|---|---|---|---|---|---|---|---|---|---|---|
| | Honeycomb dia. mm | Honeycomb length mm | Substrate | Porosity of substrate % | Oxide particles μm | Metal type/forming method | Film thickness μm | Frequency kHz | Elapsed time s | Reached temp. ° C. |
| Example 4 | 82 | 85 | Cordierite | 45 | 30 | Ni—B/plating | 2 | 80 | 60 | 300 |
| Example 5 | 82 | 85 | Cordierite | 45 | 30 | Ni—B/plating | 1 | 360 | 55 | 300 |
| Example 6 | 82 | 85 | Cordierite | 45 | 30 | Ni—B/plating | 2 | 360 | 35 | 300 |
| Comparative Ex. 4 | 82 | 85 | Cordierite | 45 | 30 | No coating | — | 80 | 300 | No Temp. change |
| Comparative Ex. 5 | 82 | 85 | Cordierite | 45 | 30 | No coating | — | 360 | 300 | No Temp. change |
| Comparative Ex. 6 | 82 | 85 | Cordierite | 45 | 30 | Ni—B/intermittent | 0.5 | 80 | 300 | 150 |
| Comparative Ex. 7 | 82 | 85 | Cordierite | 45 | 30 | Ni—B/intermittent | 0.5 | 360 | 300 | 250 |

*Heating conditions) induction coil: φ100, and induction heating output: 4 kW (7) Conclusion Regarding Test Condition 1, as shown in Table 1, in each of Examples 1 to 3 satisfying requirements of the present invention, it was possible to reach 300° C. within an elapsed time of 30 s from the start of the heating in the induction heating test of the SiC honeycomb structure. Particularly in Example 3, it was possible to reach 300° C. within a time of 9 s. Additionally, although not especially shown in Table 1, for example, there did not occur a defect that cracks were generated in the fluid heating component, especially in the honeycomb structure after the induction heating test was carried out. Therefore, when such an example is used as a part of a heating system of an exhaust gas purifying catalyst, the catalyst can be activated immediately after the start of an engine, and it is expected that a large effect is produced in improvement of a fuel efficiency.

Additionally, in each of the fluid heating components of Examples 1 to 3, it has been confirmed that any especially noticeable significance was not recognized as to a metal type (Ni—P or Ni—B) of the conductive coating layer formed on the cell surfaces of the honeycomb structure (the porous body), and a suitable result can be obtained in a prescribed range of the present invention.

On the other hand, in each of fluid heating components which did not include conductive coating layers (Comparative Examples 1 and 2), even if the SiC honeycomb substrate conductive coating layer as in Comparative Example 3, it has been confirmed that an effective heating efficiency could not be exerted and the temperature remained at about 100° C. even after the elapse of 300 s. Specifically, it is seen from comparison with Comparative Examples 1 to 3, the presence of the conductive coating layer in the present invention is indispensable. In particular, such a tendency is especially remarkably indicated when a porosity of a substrate (SiC) is high. Consequently, it has been indicated that in the fluid heating component which does not satisfy the requirements of the present invention, rapid heating or temperature rise cannot be achieved. Therefore, it has been confirmed that it is difficult to employ the comparative examples in the heating system for the improvement of the fuel efficiency.

Regarding the test condition 2, in the induction heating test using the cordierite honeycomb substrate, as shown in Table 2, though Examples 4 to 6 employing the conductive coating layer electrically connected have a volume of 10 times or more as compared to the test condition 1, it has been confirmed that temperature arrives at 300° C. within an elapsed time of 60 s from the start of heating. In particular, in Example 6, it is possible to arrive at 300° C. in 35 s. In addition, although it is not especially shown in Table 2, there did not occur a defect that cracks are generated in the fluid heating component, especially the honeycomb structure after the induction heating test. Therefore, when such an example is used as a part of a heating system of an exhaust gas purifying catalyst, the catalyst can be activated immediately after the start of an engine, and it is expected that a large effect is produced in the improvement of a fuel efficiency.

On the other hand, in each of the fluid heating components not having the conductive coating layers (Comparative Examples 4 and 5), any temperature change was not seen even if an elapsed time from the start of heating in the induction heating test arrives at 300 s. Moreover, in case of the intermittent conductive coating layer as in Comparative Examples 6 and 7, it was confirmed that an effective heating efficiency cannot be exerted and the temperature remains at 250° C. or less even if 300 s has elapsed. In addition, in the fluid heating components of Examples 4 to 6, a heating speed is changed depending on the frequency of the induction heating condition and the results that can be efficiently heated are apparent because the heating speed becomes larger as the frequency is higher. However, in Comparative Examples 4 to 6, it is not possible to arrive at 300° C. even if a frequency is raised. In other words, it was confirmed that the presence of the conductive coating layer is effective for induction heating. Moreover, it was confirmed that the frequency of the induction heating device can be lowered when the continuous conductive coating layer exists.

A fluid heating component of the present invention, a manufacturing method of the fluid heating component and a fluid heating component complex can be used in a heating system or the like to heat an exhaust gas purifying catalyst for improvement of a fuel efficiency of a car.

DESCRIPTION OF REFERENCE NUMERALS 1, 1a and 34: fluid heating component, 2, 31, 35, 40, and 106: honeycomb structure, 3, 11, 32, and 45: cell, 3a, 11a, 11b and 32a: cell surface (a through channel surface), 4, 12a, 12b, 33, and 43: conductive coating layer, 5a and 106a: one end face, 5b: the other end face, 6, 13, and 41: partition wall, 7 and 14: conductive pore portion coating layer, 8 and 44: plugging portion, 10a and 10b: incompatible fluid heating component, 30a and 30b: fluid heating component complex, 41a: partition-wall surface, 42: surface layer, 100: induction heating test apparatus, 101: high frequency power device, 102: feeder duct, 103: flexible feeder, 104: heating coil, 105: casing, 107: thermo camera, A: axial direction, F: fluid, G: raw material fluid, ID: inner diameter of the coil, and L: coil length.

What is claimed is:

1. A fluid heating component comprising:
a porous body made of ceramics and formed with through channels through which a fluid passes,
a conductive coating layer disposed on a through channel surface of at least a part of each through channel, and
a conductive pore portion coating layer disposed on the surface of a pore portion of the porous body,
wherein the conductive coating layer is electrically connected, and is continuous, and
wherein the conductive coating layer is electrically connected to the conductive pore portion coating layer, and is continuous.

2. The fluid heating component according to claim 1, wherein the conductive coating layer has at least a part of the through channels formed in an annularly continuous state, in a cut surface of the through channels which is perpendicular to a passing direction of the fluid.

3. The fluid heating component according to claim 1, wherein the porous body is a honeycomb structure comprising partition walls which define a plurality of cells extending from one end face to the other end face and formed as the through channels.

4. The fluid heating component according to claim 1, wherein the porous body has a porosity of from 0.1% to 60%.

5. The fluid heating component according to claim 1, wherein the porous body contains, as a main component, at least one ceramic component selected from the group consisting of silicon carbide, cordierite, a silicon-silicon carbide based composite material, mullite, alumina, spinel, a silicon carbide-cordierite based composite material, lithium aluminum silicate, aluminum titanate, silicon nitride, aluminum nitride, and magnesium oxide.

6. The fluid heating component according to claim 1, wherein the porous body has a thermal conductivity of from 0.1 W/m·K to 300 W/m·K.

7. The fluid heating component according to claim 1, wherein the porous body is made of ceramics containing silicon carbide as a main component, and an electric resistivity of the porous body is from 0.01 Ωcm to 10 Ωcm.

8. The fluid heating component according to claim 1, wherein the conductive coating layer possesses a multilayer structure, and comprises:
an electroless plating layer which is in contact with the surface of the porous body, and
at least one induction heating layer laminated on the electroless plating layer.

9. The fluid heating component according to claim 1, wherein the conductive coating layer has a coating layer thickness of from 0.1 µm to 500 µm.

10. A manufacturing method of the fluid heating component according to claim 1, which comprises a raw material fluid passing step of:
passing a raw material fluid of a gas or a liquid containing components of the conductive coating layer along the through channels for the fluid which are formed in the porous body made of ceramics, and
forming the conductive coating layer on the surfaces of the through channels.

11. The manufacturing method of the fluid heating component according to claim 10, wherein the porous body is a honeycomb structure comprising partition walls which define a plurality of cells extending from one end face to the other end face and formed as the through channels for the fluid,
the manufacturing method further comprising a plugging step of plugging the one end face of the honeycomb structure in accordance with a predetermined arrangement standard, and plugging the residual cells of the other end face,
wherein in the raw material fluid passing step, the raw material fluid is passed through the honeycomb structure in which plugging portions are formed by the plugging step, to form the conductive coating layer.

12. A fluid heating component complex which is formed by using the fluid heating component according to claim 1, and
which is monolithically constructed by using a plurality of prismatic columnar fluid heating components, or which is monolithically constructed by using at least one of the prismatic columnar fluid heating components, and one or a plurality of prismatic columnar porous bodies made of ceramics and formed with through channels through which a fluid passes.

* * * * *